Patented June 24, 1947

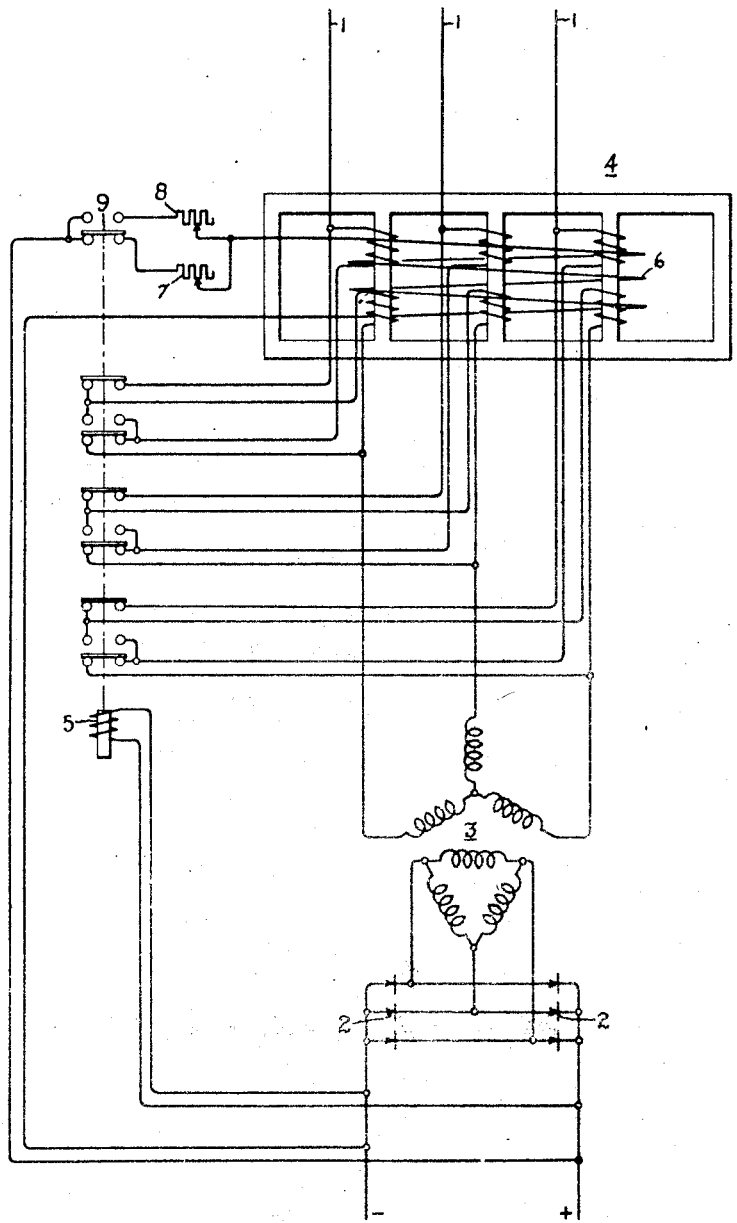

2,422,958

UNITED STATES PATENT OFFICE 2,422,958

SATURABLE REACTOR SYSTEM

Alvin L. Embry, Revere, Mass., assignor to General Electric Company, a corporation of New York Application January 29, 1945, Serial No. 575,119

4 Claims. (Cl. 171—242)

This invention relates to electric circuits and more particularly to improvements in variable reactor control systems for electric circuits.

One way of improving any variable impedance control device is to increase its range of impedance variation. In the case of direct-current saturable reactors the usual limits of the reactance range occur respectively when the core has no unidirectional flux and when it is so completely saturated by unidirectional flux that the variations in alternating current produce no substantial variation in core flux.

This invention is characterized by extending the range of variable reactance of a reactor, particularly a direct-current saturated reactor by varying the electrical connections between its alternating-current windings. For example, in the case of conventional direct-current saturable reactors which have two alternating-current windings per phase, switching means is provided for selectively connecting these windings in series and in parallel. However, the invention is not limited to the use of two alternating-current windings per phase and as many additional windings, and additional circuit interconnections of these windings as desired may be provided so as to produce any desired range of variable reactance. Furthermore, it will be understood that the invention in its broader aspects is not limited to the direct-current saturation of the reactor and that the series-parallel or other changes in the connections of the alternating-current windings can be used alone for varying the reactance of the reactor.

An object of the invention is to provide a new and improved electric circuit.

Another object of the invention is to provide a new and improved variable reactor system.

An additional object of the invention is to provide a novel wide-range direct-current saturable reactor system.

The invention will be better understood from the following description taken in connection with the accompanying drawing and its scope will be pointed out in the appended claims.

Referring now to the single figure of the accompanying drawing which illustrates diagrammatically an embodiment of the invention as applied to a rectifier circuit which is particularly adapted for two-rate battery charging, there is shown therein a main alternating-current supply circuit 1 which is illustrated by way of example as a three-phase circuit. The current of circuit 1 is rectified by a three-phase rectifier 2 which is connected to the circuit through a three-phase transformer 3.

Connected in the circuit 1 on the input side of the transformer 3 is a direct-current saturable reactor 4 having two windings per phase. The windings of each phase are arranged for selective series-parallel connection by means of a voltage relay 5 which is connected to be responsive to the output voltage of the rectifier. The reactor 4 also has a common direct-current saturating winding 6 which can be energized from any suitable source of direct current, such as the output terminals of the rectifier. In order to preselect the energization of the direct-current saturating winding 6 for both the series and the parallel connections of the alternating-current windings of the reactor a pair of adjustable resistors 7 and 8 are provided and these are selectively connected in series with the winding 6 by means of a separate set of contacts 9 on the voltage responsive control relay 5.

It will, of course, be understood that all of the windings of the reactor are on a magnetic core. They can all be on the same core in the case of a three-phase reactor in which the windings of each phase are on a different leg and the saturating winding links all three legs and is thus in non-inductive relation with the alternating-current circuit. Also, three separate single-phase reactors may be used, if desired, in which case the direct-current circuit will include all three direct-current saturating windings. There are numerous forms of direct-current saturating reactors which are well known to those skilled in the art. In the case of single-phase reactors two alternating-current windings are almost always provided and their polarities are arranged oppositely with respect to the direct-current saturating windings so that the alternating-current and direct-current circuits of the reactor are in non-inductive relation.

The operation of the illustrated embodiment of the invention is as follows: Assume that the alternating-current supply circuit is energized in its normal manner and that the voltage of the direct-current output circuit of the rectifier 2 is relatively low so that the voltage relay 5 is dropped out. This would correspond to conditions if the rectifier were connected to a discharged battery whose voltage was consequently relatively low. As will be seen, the two alternating-current windings for each phase of the saturable reactor are connected in parallel through associated sets of contacts for the voltage relay 5 and that the saturating winding 6 of the reactor is energized through the resistor 7. If now the output voltage of the rectifier rises sufficiently, the voltage relay 5 will pick up, thus changing the connection of the alternating-current windings of the reactor from parallel to series and also changing the energization of the direct-current saturating winding 6 by removing resistor 7 from its circuit and inserting resistor 8 in its circuit. This has the effect of increasing the reactance of the reactor, thereby decreasing the current through the rectifier.

While there has been shown and described a particular embodiment of this invention, it will be obvious to those skilled in the art that various changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. A variable reactor comprising, in combination, a magnetic core, an alternating-current circuit including a plurality of windings on said core, a direct-current circuit including a winding on said core in non-inductive relation to said alternating-current circuit, and circuit controlling means for varying the current in said direct-current circuit independently of the current in said alternating current circuit, additional circuit controlling means for varying the electrical connections between the windings in said alternating-current circuit and interconnecting means for coordinating the operation of both of said circuit controlling means.

2. A variable reactor system comprising, in combination, a magnetic core, an alternating-current circuit having at least two alternating-current windings per phase on said core, a direct-current circuit having a winding on said core in non-inductive relation to said alternating-current circuit, and means for selectively connecting said alternating-current windings in series and in parallel.

3. A variable reactor system comprising, in combination, a magnetic core, an alternating-current circuit having two alternating-current windings on said core, a direct current circuit having a winding on said core in non-inductive relation to said alternating-current circuit, means for varying the current in said direct-current circuit, and means for selectively connecting said alternating-current windings in series and in parallel.

4. A variable reactor system comprising, in combination, a magnetic core, an alternating-current circuit having a pair of windings on said core, a direct-current circuit having a winding on said core in non-inductive relation to said alternating-current circuit, means for varying the current in said direct-current circuit, means for selectively connecting said alternating-current windings in series and in parallel, and automatic means responsive to an electrical condition of one of said circuits for coordinating the operation of both of said last-mentioned means.

ALVIN L. EMBRY.

REFERENCES CITED

The following references are of record in the file of this patent:

UNITED STATES PATENTS

| Number | Name | Date |
| --- | --- | --- |
| 2,082,607 | Amsden | June 1, 1937 |